(12) United States Patent
Dettmann

(10) Patent No.: US 6,286,548 B1
(45) Date of Patent: Sep. 11, 2001

(54) FLUID CONTROL ELEMENT

(75) Inventor: Heinrich Dettmann, Niedernhall (DE)

(73) Assignee: Burkert Werke GmbH & Co, Ingelfingen (DE)

( * ) Notice: Subject to any disclaimer, the term of this patent is extended or adjusted under 35 U.S.C. 154(b) by 0 days.

(21) Appl. No.: 09/461,384

(22) Filed: Dec. 15, 1999

(30) Foreign Application Priority Data

Dec. 23, 1998 (DE) .......................................... 298 22 959 U

(51) Int. Cl.[7] .................................................. F15B 13/044
(52) U.S. Cl. .............................. 137/596.17; 137/625.44; 137/870
(58) Field of Search .......................... 137/596.17, 625.44, 137/870

(56) References Cited

U.S. PATENT DOCUMENTS

| | | |
|---|---|---|
| 4,131,130 * | 12/1978 | Ruby ............................. 137/596.17 |
| 4,535,810 | 8/1985 | Duder et al. . |
| 4,621,660 * | 11/1986 | Klocke ........................... 137/625.44 |
| 4,765,370 | 8/1988 | Ariizumi et al. . |
| 4,938,249 | 7/1990 | Nordeen . |
| 5,711,346 * | 1/1998 | Pieloth et al. .................. 137/625.44 |

FOREIGN PATENT DOCUMENTS

| | | |
|---|---|---|
| 3630200 | 3/1988 | (DE) . |
| 295 07 380 | 8/1995 | (DE) . |
| 297 18 306 U1 | 1/1998 | (DE) . |
| 1249404 | 3/1961 | (FR) . |
| WO 82/03431 | 10/1982 | (WO) . |

* cited by examiner

Primary Examiner—Gerald A. Michalsky
(74) Attorney, Agent, or Firm—Nixon Peabody LLP; Stuart J. Friedman

(57) ABSTRACT

A fluid control element comprises a housing in which two control chambers are formed, which are isolated from each other and comprise a working port each as well as two pressure ports. Two of these ports are provided with a sealing seat each. The fluid control element further comprises a switching element movably mounted in said housing and comprising a sealing part in each control chamber. The sealing part cooperates with the sealing seats such that these are opened or closed. The fluid control element further comprises an actuating member for the switching element, the actuating member being able to bring the switching element into three positions.

1 Claim, 9 Drawing Sheets

FLUID CONTROL ELEMENT

BACKGROUND OF THE INVENTION

U.S. Pat. No. 4,765,370 shows a fluid control element comprising a housing in which two control chambers are formed, which are each isolated from each other and comprise a working port each as well as two pressure ports, two of the ports being provided with a sealing seat each. The fluid control element further comprises a switching element movably mounted in the housing and comprising a sealing part in each control chamber, the sealing part cooperating with the sealing seats such that these are opened or closed, and still further comprises an actuating member for the switching element. This fluid control element represents a 4/2-way valve for actuating hydraulic actuator cylinders, for example. When actuating, for example, a double-acting hydraulic cylinder, the working port of the one control chamber is connected to a working port of the hydraulic cylinder and the working port of the other control chamber is connected to the other working chamber of the hydraulic cylinder. In a first position of the switching element, the resting position, the one working chamber of the hydraulic cylinder is pressurized so that a movement occurs in a first direction, whilst in an activated position of the switching element into which the switching element is moved by an electric magnet, the other working chamber of the hydraulic piston is pressurized so that a movement occurs in the opposite direction.

It is often required, however, in addition to a movement of the hydraulic piston in a first and a second direction that the hydraulic piston, for example, is maintained fixed in a position or is freely movable. For this purpose 4/3-way valves are needed as described with reference to FIG. 13. Illustrated schematically in FIG. 13 is a hydraulic piston 1 disposed between two working chambers 2, 3. The working chamber 2 is connected to a working port A of a 4/3-way control element illustrated schematically and identified by reference numeral 10, and the working chamber 3 is connected to a working port B. Furthermore, two pressure ports P, R are provided, port P providing a pressurized fluid and port R forming a return flow conduit.

The control element shown as example 1 permits three operating conditions. In the left-hand switching position the hydraulic piston 1 is biased so as to move to the right. In the middle switching position the hydraulic piston 1 is blocked. In the left-hand switching position the hydraulic piston 1 is biased so as to move to the left.

The examples 2 and 3 likewise make possible three switching positions, the left-hand and the right-hand switching positions in each case corresponding to the right-hand and left-hand switching positions of the first example. The middle switching position in example 2 results in the hydraulic piston 1 being freely movable and the middle switching position of example 3 results in the hydraulic piston 1 being blocked by the pressure furnished by the pressure port P.

Hitherto, achieving such switching functions necessitated the use of piloted slide valves.

The object of the invention consists in providing a simple, direct-acting control element having a 4/3 operational mode to thus reduce the expense in terms of technical equipment in actuating a cylinder and to permit a more direct and faster operation of actuator cylinders and actuators, respectively.

BRIEF DESCRIPTION OF THE INVENTION

To achieve this object, a fluid control element is provided which comprises a housing in which two control chambers are formed, which are isolated from each other and comprise a working port each as well as two pressure ports. Two of these ports are provided with a sealing seat each. The fluid control element further comprises a switching element movably mounted in the housing and comprising a sealing part in each control chamber. The sealing part cooperates with the sealing seats such that these are opened or closed. The fluid control element further comprises an actuating member for the switching element, the actuating member being able to bring the switching element into three positions. In this way the desired three switching positions are achievable with a control element having two control chambers without additional slide valves being necessary. Such an actuating member with which the switching element is may be brought into three positions is, for example a solenoid drive having a polarized drive element, the permanent magnet of which in the non-energized condition of its solenoid holds the switching element in a middle position, which also represents the resting position, and in the energized condition shifts the switching element into the one or the other direction depending on the direction of current flow.

In accordance with one preferred embodiment of the invention it is provided for that the sealing seats of one control chamber are disposed opposite each other on the one and the other side of the control chamber and that the sealing part arranged in this control chamber is configured with two opposing tongues disposed between the sealing seats and configured so as to be elastically resilient, and in the resting position are spaced away from each other such that they may simultaneously close the two sealing seats. In this embodiment all ports in the middle or resting position are closed. By moving the switching element, starting from the resting position, into the one or the other direction the desired ports may be selectively opened.

As an alternative it may be provided for that the sealing seats of one control chamber are disposed opposite each other on the one and the other side of the control chamber and the sealing part arranged in this control chamber is in contact with either the one or the other sealing seat. In this embodiment one sealing seat of each control chamber is closed in the resting position. As soon as the switching element is actuated in any direction, one of the sealing parts is lifted from the corresponding sealing seat and pressed against the opposite sealing seat whilst the other sealing part remains in contact at the corresponding sealing seat with no change in the switching condition in this control chamber. Depending on how the various ports are put in circuit, a variety of different switching conditions results.

In this alternative the sealing parts arranged in the two control chambers extend in the same plane or in different planes. In the resting position one of the sealing parts is then in contact with the sealing seat disposed on one side of the corresponding control chamber whilst the other sealing part is in contact with the other sealing seat arranged at the other side of the other control chamber. When the sealing parts are arranged in the same plane, the actuating travel needed for making the changeover is achieved by differing the spacing of the sealing seats away from the plane of the sealing parts in the resting position, whereas when the sealing parts are arranged in different planes the necessary actuating travel is achieved by different spacings assumed by the sealing seat from the sealing parts being in the resting position.

In accordance with a further embodiment it may be provided for that the sealing seats of one control chamber are arranged mutually staggered on the one and on the other side of the control chamber, and that the sealing part arranged in this control chamber is configured with two tongues arranged side by side, each of which being assigned to one of the sealing seats and configured so as to be springy and elastic. The effect of this configuration is basically the same as that described above having the two tongues opposite each other, except that here a larger number of switching conditions is possible. If required, in one of the control chambers the configuration as described above including opposite sealing seats and opposite tongues may be provided, whilst in the other control chamber the configuration having staggered sealing seats and tongues lying side by side may be employed.

It is preferably provided for, however, that in both control chambers the sealing seats of one control chamber are arranged mutually staggered on the one and the other side of the corresponding control chamber, a maximum number of switching conditions being possible in this case.

In this embodiment it may be either provided for that the tongues of the sealing parts of the switching element arranged in the two control chambers extend in the same plane. Technically the same effect is achievable by providing the two tongues, arranged in one chamber, so as to be mutually staggered. In cooperation with a suitable arrangement of the sealing seats relative to the arrangement of the tongues in the resting position, a variety of conditions is possible, i.e. the sealing seats in the two control chambers either being arranged such that in the resting position the tongues of the sealing parts are in contact with all sealing seats in the two control chambers, or as an alternative the sealing seats in the two control chambers are arranged such that in the resting position the tongues of the sealing parts are in contact with all sealing seats of a sole control chamber and with no sealing seat of the other control chamber. Finally, it is possible that the sealing seats are arranged in the two control chambers such that in the resting position the tongues of the sealing parts are each in contact with one sealing seat in each control chamber. Depending on the configuration selected in each case a wealth of different switching conditions is achieved with which any desired mode of actuating an actuator, for example a hydraulic actuating cylinder, is achievable.

Advantageous aspects of the invention read from the sub-claims.

BRIEF DESCRIPTION OF THE DRAWINGS

The invention will now be described with reference to various embodiments illustrated in the attached drawings in which.

DETAILED DESCRIPTION OF THE INVENTION

Figure 1:
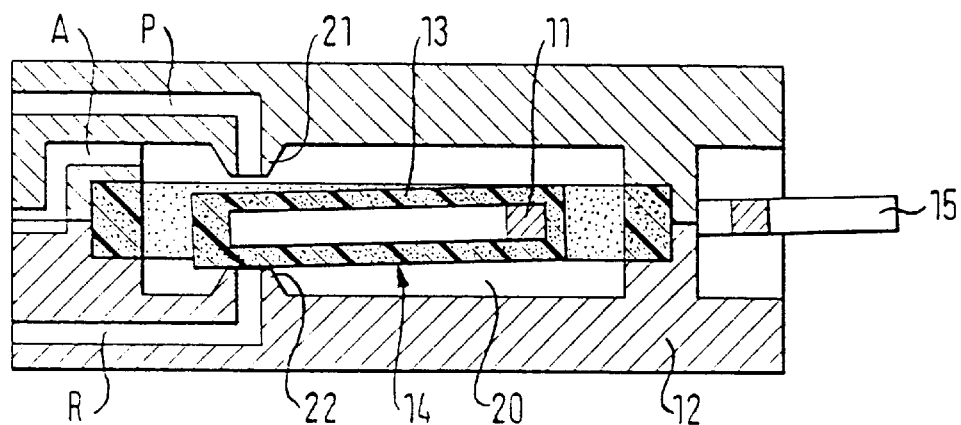
FIG. 1 is a schematic illustration of part of a housing of a control element in accordance with the invention, comprising the control chamber and the sealing part arranged therein.
Figure 2:
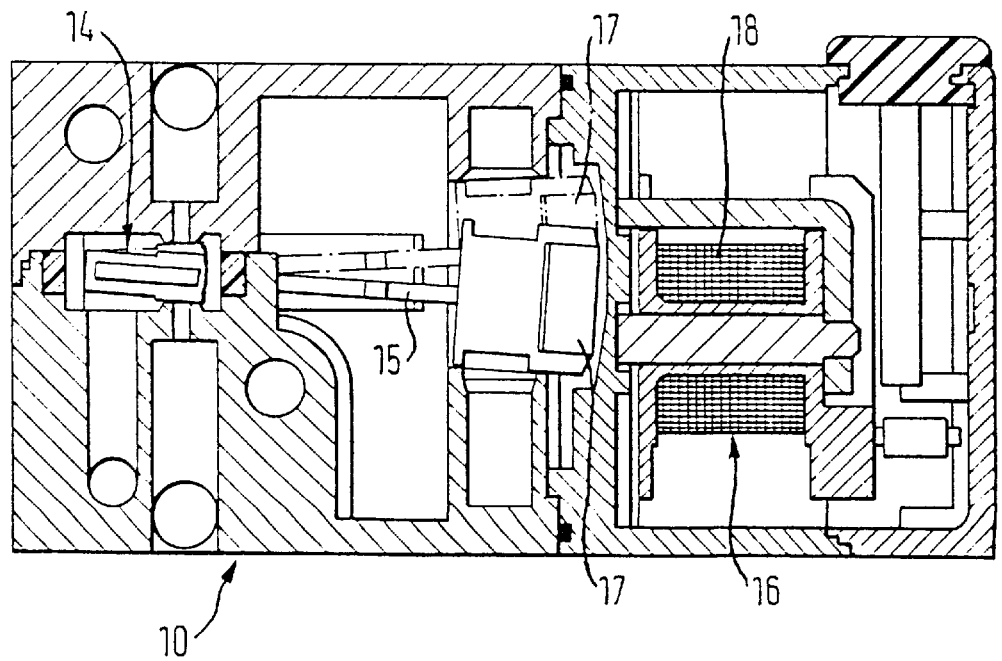
FIG. 2 is a schematic section view of a control element in accordance with the invention.

Referring now to FIGS. 1 and 2, the configuration of the control elements in accordance with the invention will now be described in general. The control element 10 comprises a housing 12 in which two control chambers 20, 30 are configured so as to lie side by side and isolated from each other (only one of the chambers can be seen in FIG. 1). Opening into each control chamber is a working port and two pressure ports, the working port being identified by A and B, respectively, and the pressure ports by P and R, respectively. Two of the ports in each control chamber 20 and 30, respectively, are provided with a sealing seat 21, 22 and 31, 32, respectively. Cooperating with the sealing seats 21, 22 and 31, 32 is a switching element identified in general by the reference numeral 14. The switching element 14 is movable from a resting position into a first and a second position by acting on an actuator protuberance 15. In all, three positions of the switching element 14 are thus possible. For actuating the switching element 14 an actuating member 16 is provided (see also FIG. 12) configured, for example, as a solenoid drive having a polarized drive element, the permanent magnet of which in the non-energized condition of a solenoid causes a middle position of the actuator protuberance 15 and in the energized condition shifts the actuating arm in the direction of either arrow 1 or arrow 2, depending on the direction of the current.

Figure 12:
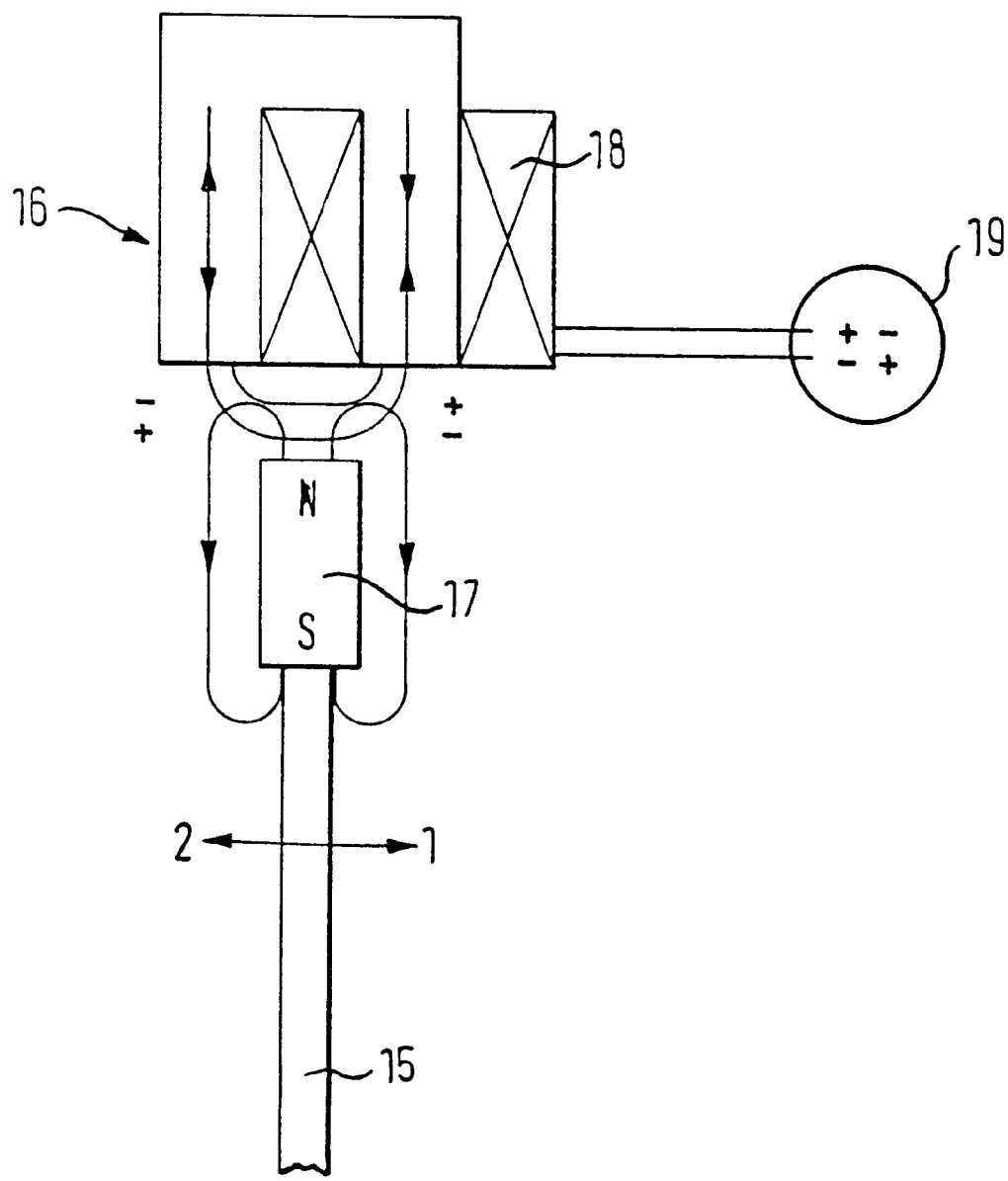
FIG. 12 is a schematic view of an actuating member as may be used with the control elements in accordance with the invention.
Figure 13:
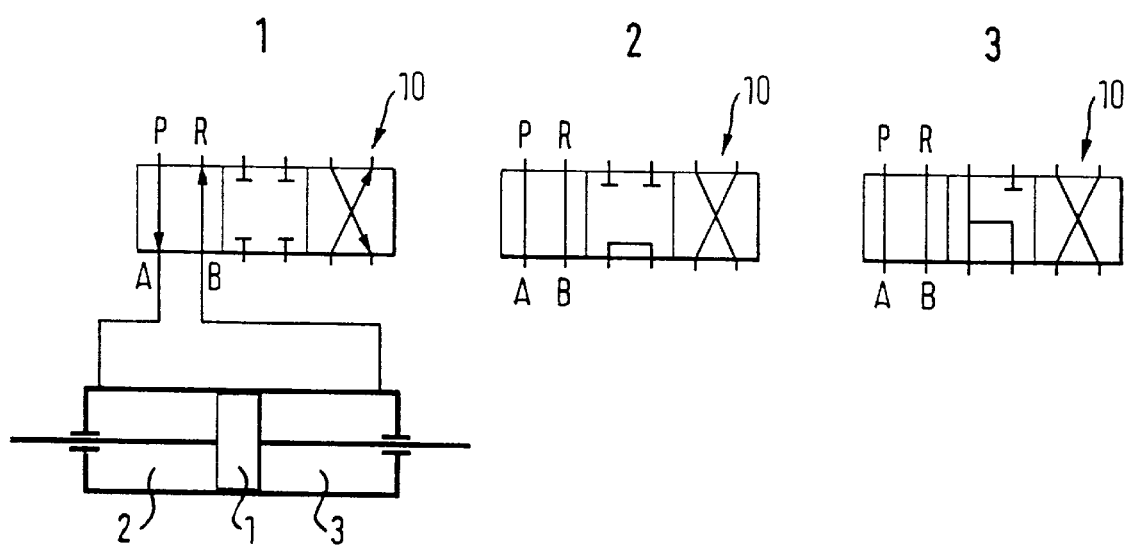
FIG. 13 is a schematic illustration of an actuator including various control elements.

Referring now to FIG. 12 there are illustrated the two positions 1 and 2 of a magnet 17 applied to the actuator protuberance 15. The solenoid of the actuating member is identified by the reference numeral 18 and the switchable voltage source is identified in FIG. 12 by the reference numeral 19.

The basic configuration of the switching element 14 consisting of a core 11 and an elastomer 13 surrounding the latter, as well as the mounting arrangement of the switching element in the housing 12 is known in principle from U.S. Pat. No. 5,711,346 incorporated herein by reference.

Figure 3:
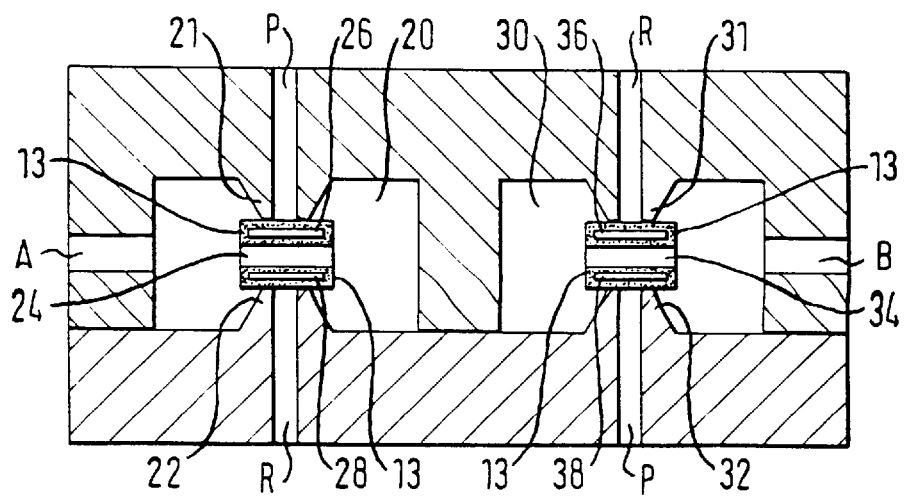
FIG. 3 is a schematic cross-section through the two control chambers of a control element according to a first embodiment of the invention.
Figure 4:
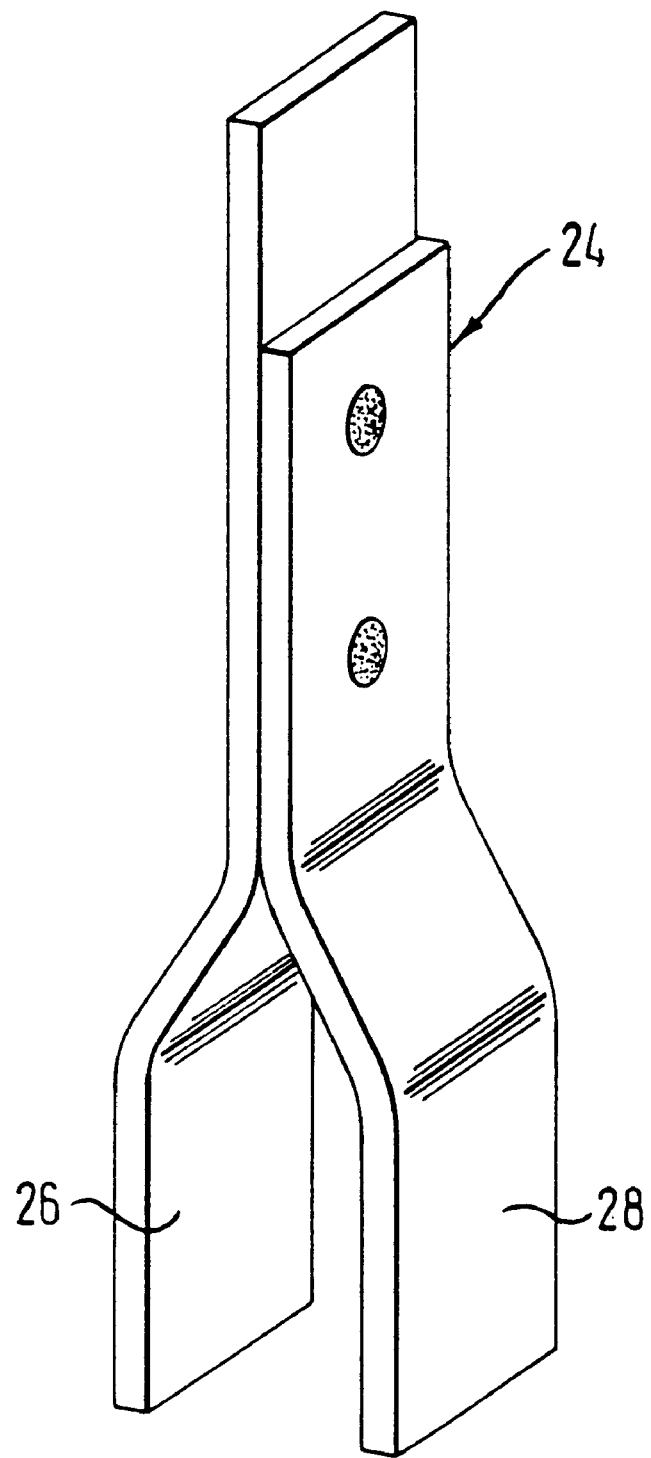
FIG. 4 is a broken view in perspective of a sealing part employed in the control element as shown in FIG. 3.

Referring now to FIGS. 3 and 4 there is illustrated a control element as will now be described in accordance with a first embodiment of the invention. The switching element 14 protrudes into each control chamber 20, 30 with a sealing part 24 and 34, respectively. The two sealing parts 24, 34 are fixedly connected to the actuator protuberance 15 and are moved simultaneously with the actuator protuberance. At the end freely protruding into the corresponding control chamber each sealing part 24, 34 is provided with two tongues 26, 28 and 36, 38, respectively. The two tongues 26, 28 and 36, 38, respectively, are configured so as to be elastically resilient and opposite each other. As evident from FIG. 4 one of the tongues may be configured by a crank of the corresponding sealing part whilst the opposite tongue is formed by an additional part cranked mirror inverted and connected to the sealing part, for example, by spot welding. Of course, provided around each of the tongues 26, 28 and 36, 38, respectively, is the elastomer layer 13 known as such.

The sealing seats 21, 22 and 31, 32, respectively, which are arranged in the control chambers 20, 30 are configured so as to lie opposite each other (see FIG. 3). Although this is not necessarily the case, the ports assigned to the sealing seats 21, 22 and 31, 32, respectively, have the same middle axis, i.e. the corresponding sealing seats are disposed coaxially to each other. Opening into each control chamber on one side of the sealing seats is the remaining port. In the configuration as shown in FIG. 3 the ports are put in circuit such that the sealing seats are assigned to the two pressure ports P, R whilst the working port A and B, respectively, opens into the side.

The spacing of the two sealing seats 21, 22 and 31, 32 assigned to each other is selected such that in the resting position, i.e. with the actuator protuberance 15 not actuated, the two tongues 26, 28 and 36, 38, respectively, close the corresponding sealing seats. This is evident from FIG. 3. In this position all fluid ports are closed. When, starting from this position, the actuating protuberance is acted upon, the sealing parts 24, 34 are moved either upwards, resulting in the port R of the control chamber 20 and the port P of the control chamber 30 being connected to the working ports A, B, or downwards, resulting in the pressure ports R of the control chamber 20 and P of control chamber 30 being connected to the working ports A, B. It is in this way that a 4/3-way control element is produced.

By differently putting the various ports of the illustrated control element in circuit, other switching conditions are possible, as will readily be appreciated.

Figure 5:
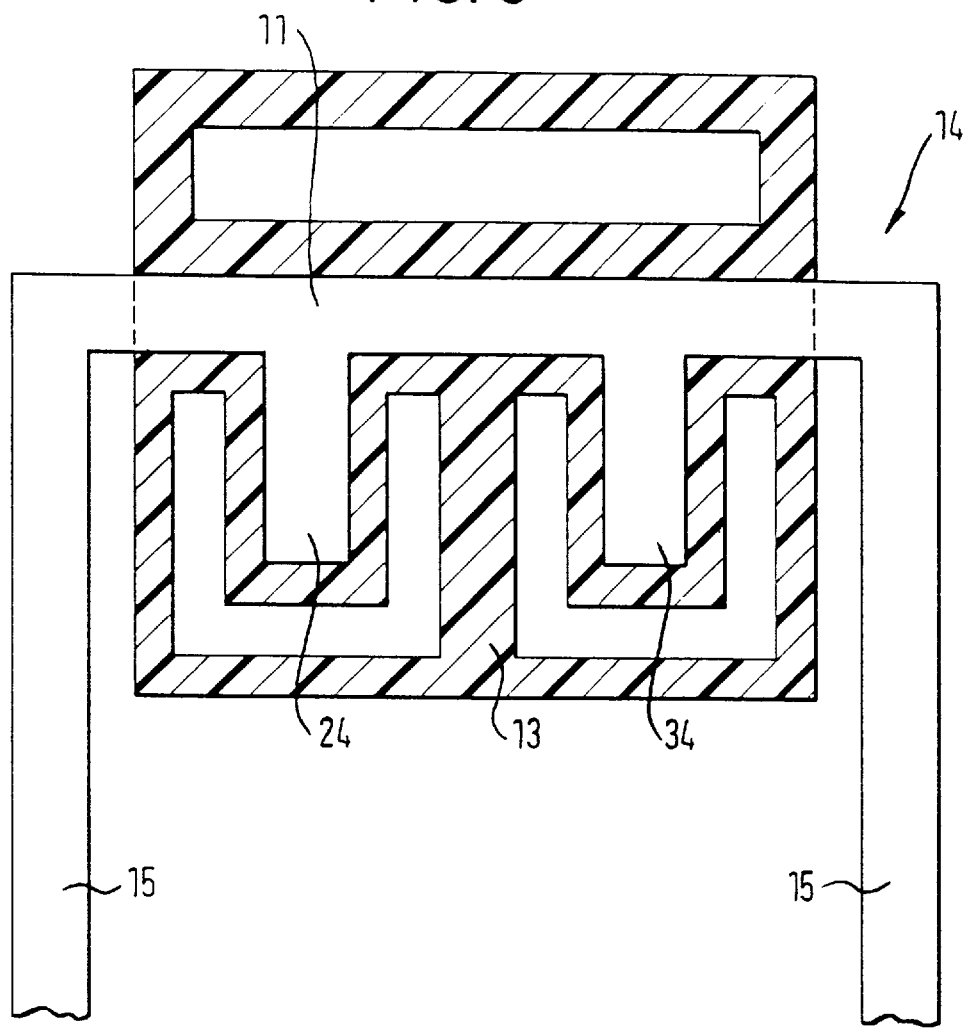
FIG. 5 is a schematic plan view of a switching element as may be used in a control element in accordance with a second embodiment of the invention.
Figure 6:
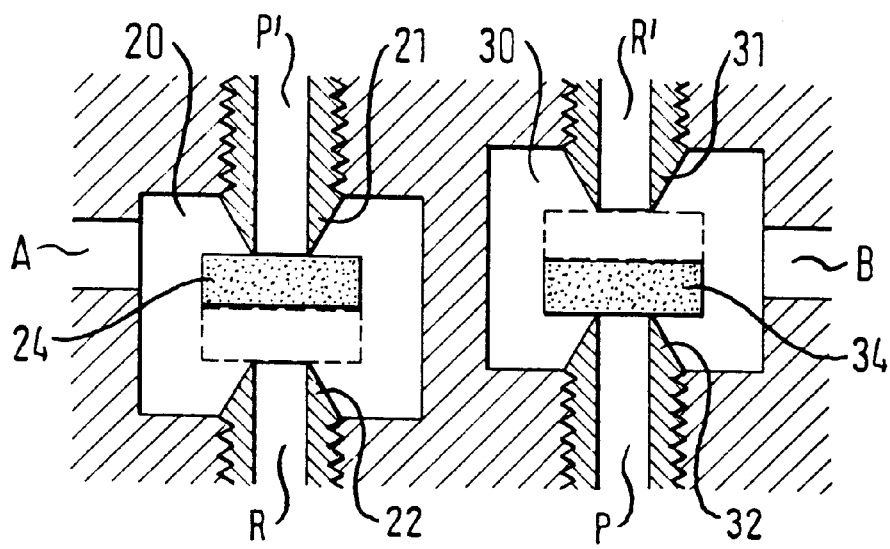
FIG. 6 shows in a schematic cross-section through the control chamber a control element according to the second embodiment of the invention.

Referring now to FIGS. 5 and 6 there is described a second embodiment of the control element in accordance with the invention. The switching element 14 comprises two sealing parts 24, 34 arranged side by side and in the same plane (see more particularly FIG. 6). The sealing seats 21, 22 and 32, 32, respectively, which are arranged in the control chambers 20, 30 protrude into the control chambers differingly far. As evident from FIG. 6 the sealing seat 21 arranged on the upper side of the control chamber 20 protrudes so far into the control chamber that it is in contact with the sealing part 24 located in the starting position. In a similar way the sealing seat 32 arranged on the underside of the control chamber 30 protrudes so far into the control chamber that it is in contact with the sealing part 24 located in the resting position. The sealing seat 22 arranged on the underside of the control chamber 20 as well as the sealing seat 32 arranged on the underside of the control chamber 30 are arranged spaced away from the sealing part 24 and 34, respectively, located in the resting position.

Referring now to the resting position of the sealing parts 24, 34 as shown in FIG. 6 the switching element can be made to assume two positions. In a first position in which the two sealing parts 24, 34 are biased so as to move upwards there is no further change in the position of the sealing part 24 since it is already in contact with the sealing seat 21 and is elastically deformed, whereas the sealing part 34 is lifted from the sealing seat 32 and pressed against the sealing seat 31. In this position the pressure port P is thus connected to the working port B of the control chamber 30 whilst as regards the control chamber 20 no change in the switching condition occurs. When, however, the sealing parts 24, 34 are biased so as to move downwards out of the resting position there is no change in the switching condition as regards the control chamber 30 whilst the sealing part 24 is lifted from the sealing seat 21 and pressed against the sealing seat 22. Now, the pressure port identified P in this case is connected to the working port A of the control chamber 20.

Figure 7:
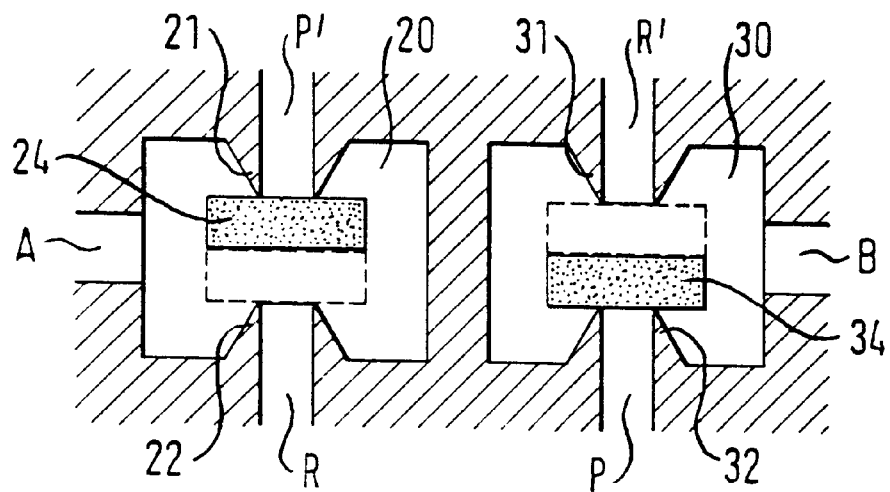
FIG. 7 is a view, corresponding to that as shown in FIG. 6, of a control element in accordance with one variant of the second embodiment of the invention.

Referring now to FIG. 7 there is illustrated a variant of the second embodiment as shown in FIGS. 5 and 6. The difference in this case being that, now, the sealing seats 21, 31 arranged on the upper side of the control chambers 20, 30 as well as the sealing seats 22, 32 arranged on the underside of the chambers are each located at the same level. Furthermore the sealing parts 24, 34 are no longer arranged in the same plane, but mutually staggered.

The effect is similar to that as explained for the second embodiment. When starting from the resting position as shown in FIG. 7 the sealing parts 24, 34 are biased so as to move upwards there is no change in the switching condition as regards control chamber 20 whilst the sealing part 34 in the control chamber 30 is lifted from the sealing seat 32 and pressed against the sealing seat 31, whereas when the sealing parts 24, 34 are biased so as to move downwards there is no change in the switching condition as regards control chamber 30 whilst the sealing part 24 of the control chamber 20 is lifted from the sealing seat 21 and pressed against the sealing seat 22.

Both in the second embodiment as shown in FIGS. 5 and 6 and in the variant of the second embodiment as evident from FIG. 7, different switching conditions may be achieved by suitable swapping of putting the ports in circuit.

Figure 9:
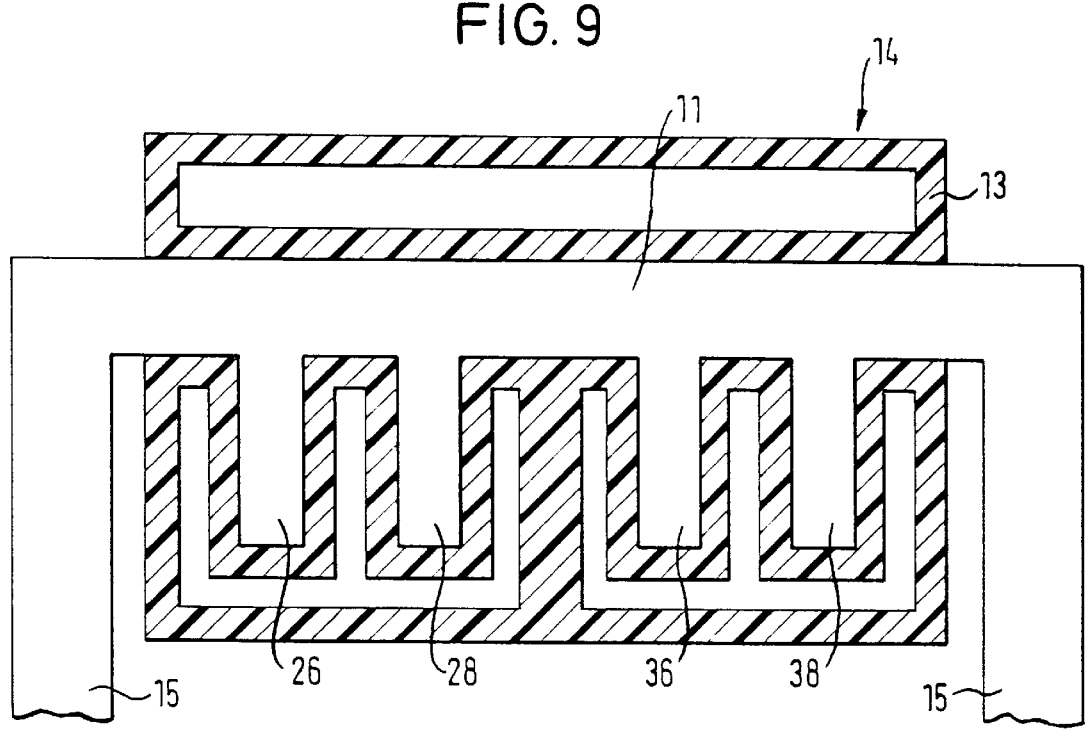
FIG. 9 is a schematic plan view of a switching element as may be used in a control element according to FIG. 8.
Figure 8:
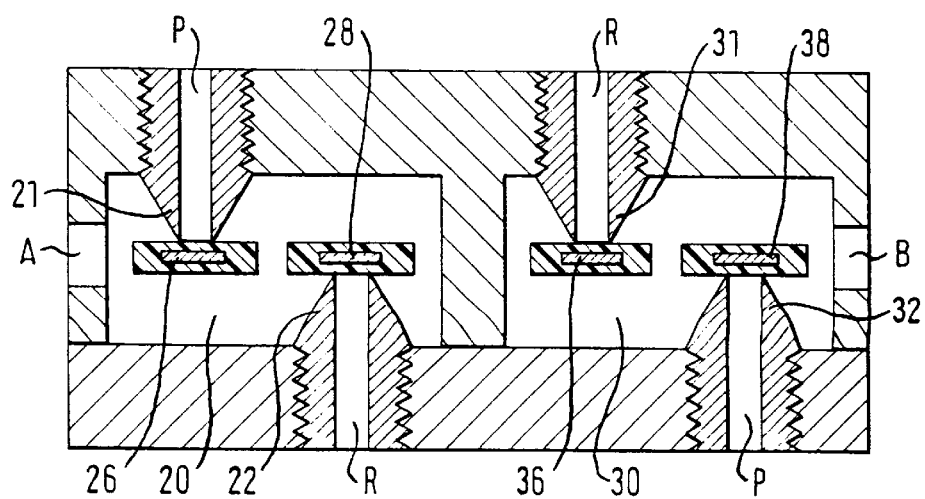
FIG. 8 is a schematic cross-section through the control chamber of a control element in accordance with a third embodiment of the invention.
Figure 10A:
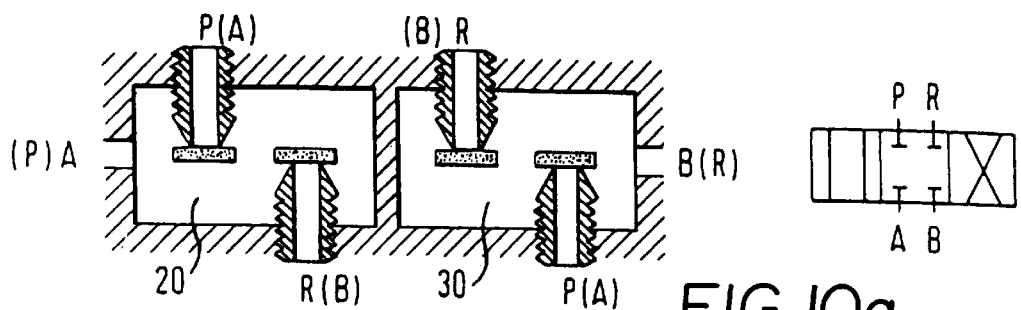
FIGS. 10a, 10b, 10c, 10d, and 10e illustrate various designs of the control element in accordance with the third embodiment.
Figure 10B:
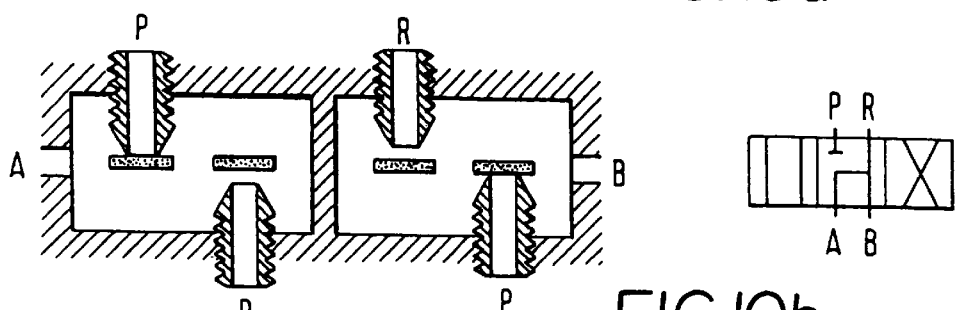
Figure 10C:
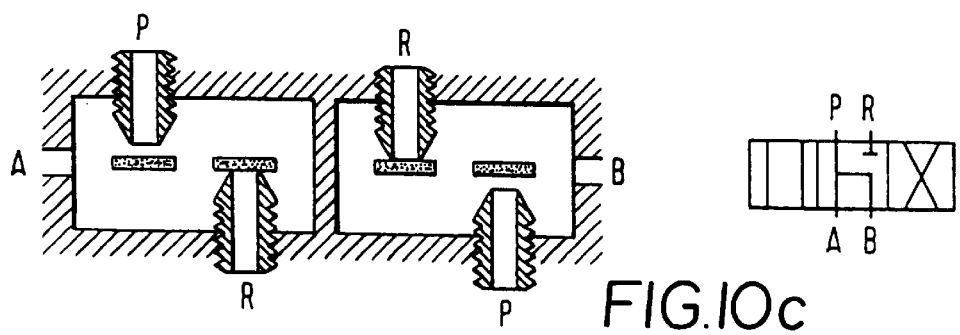
Figure 10D:
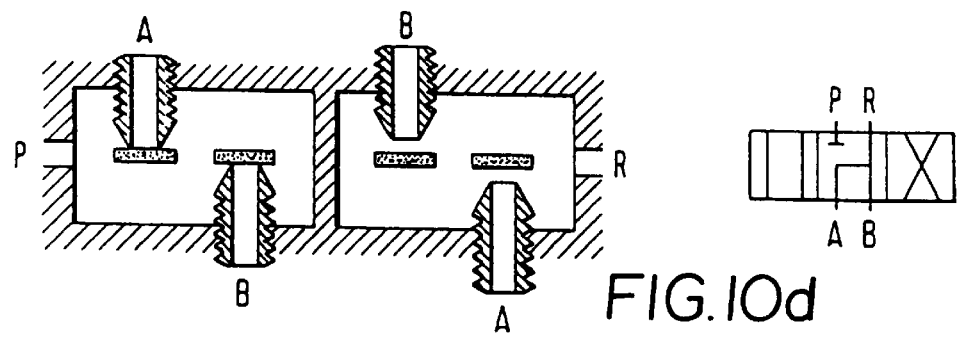
Figure 10E:
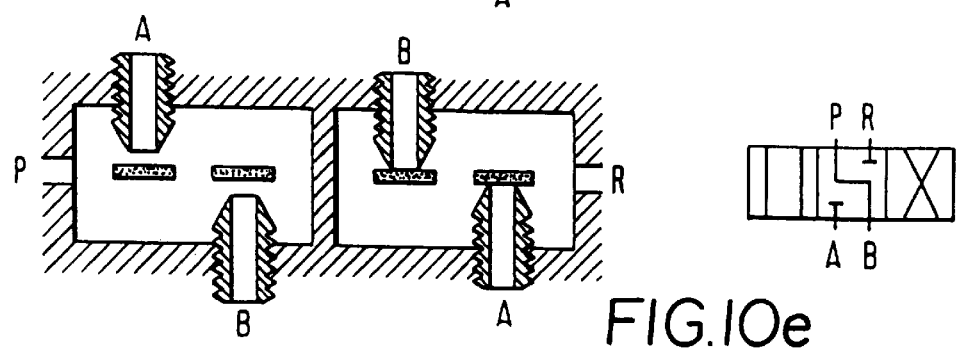
Figure 11A:
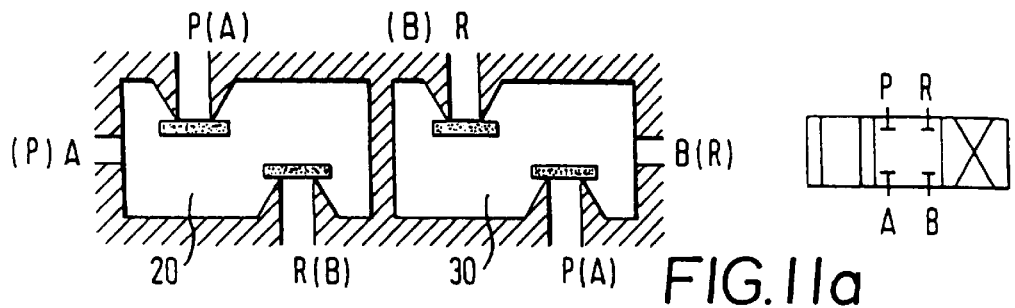
FIGS. 11a, 11b, 11c, 11d, and 11e illustrate various designs of a variant of the third embodiment.
Figure 11B:
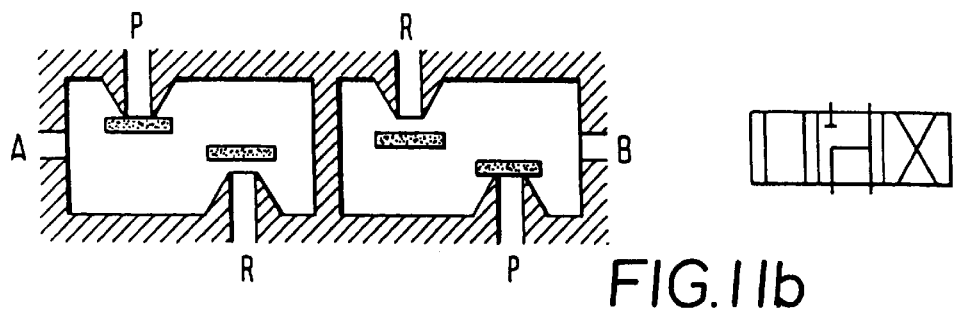
Figure 11C:
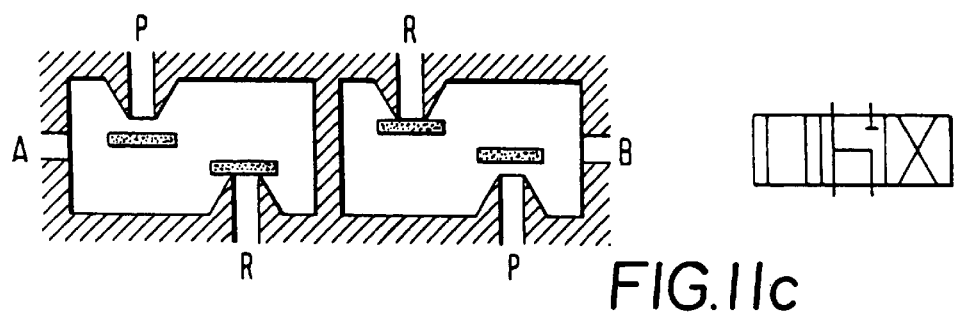
Figure 11D:
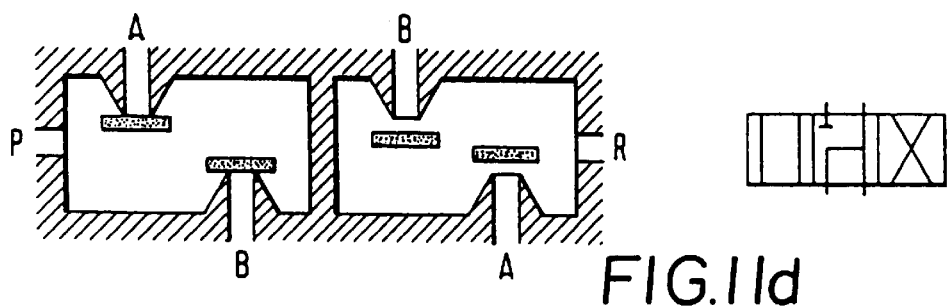
Figure 11E:
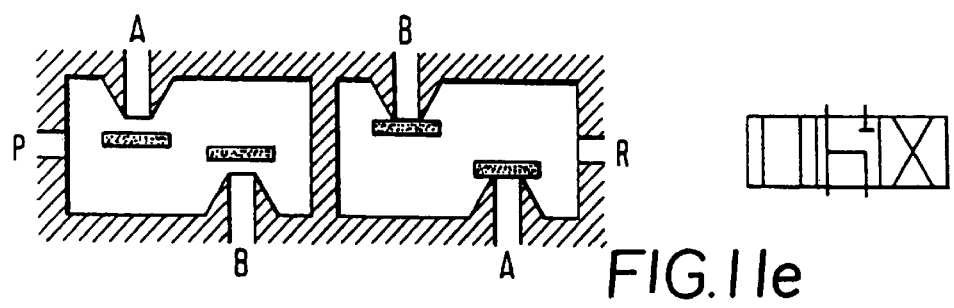

Referring now to FIGS. 8 and 9 t here is described a third embodiment of a control element in accordance with the invention. In this embodiment the sealing seats arranged in the control chambers 20, 30 are no longer configured coaxially opposite each other, but mutually staggered as evident from FIG. 8. In this arrangement the sealing seats 21, 31 arranged on the upper side of the control chambers 20, 30 protrude into the control chambers up to the same level and also the sealing seats 22, 32 arranged on the underside of the control chambers 20, 30 are each located at the same level.

The sealing part of the switching element 14 protruding into the control chamber 20 and 30, respectively, consists for each control chamber of two parallel tongues arranged side by side. Thus, two tongues 26, 28 protrude into the control chamber 20 and two tongues 36, 38 protrude into the control chamber 30. All tongues 26, 28, 36, 38 extend in the same plane in the resting position. As evident from FIG. 8 the spacing of the level defined by the sealing seats 21, 31 from the level defined by the sealing seats 22, 32 is dimensioned such that all tongues are in contact with their assigned sealing seats in the resting position of the switching element 14, closing them off. In the resting position as shown in FIG. 8 all ports are thus blocked.

When starting from the resting position as shown in FIG. 8 the tongues 26, 28, 36, 38 are biased so as to move upwards, there is no change in the condition as regards the tongues 26, 36 since these tongues react merely elastically and continue to remain in contact with the corresponding sealing seats, whereas the tongues 28, 38 are lifted from their assigned sealing seats 22, 32 and the working port A of chamber 20 is connected to the pressure port R, whilst the working port B of control chamber 30 is connected to the pressure port P.

Referring now to FIG. 10, in the illustrations *a*) to *e*) there are shown various control elements in accordance with a third embodiment each achieving a different switching condition by a change in the spacing of the sealing seats from the corresponding tongues in the resting position and by a different putting in circuit of the various ports. The resulting switching conditions are evident from the illustrations and the likewise indicated switching symbols so that there is no need to detail them.

Referring now to FIG. 11, in the illustrations *a*) to *e*) there are shown various control elements in accordance with a variant of the third embodiment on the basis of the gist as known from FIG. 7 showing that the tongues of the switching element are mutually staggered. In this arrangement and in conjunction with differingly putting the ports in circuit and with different spacings between the sealing seats and the tongues in the resting position, the same switching conditions are achievable as already shown in the illustrations *a*) to *e*) as evident from FIG. 10.

What is claimed is:

1. A fluid control element, comprising a housing in which two control chambers are formed, which are isolated from each other and comprise a working port each as well as two pressure ports, two of said ports being provided with a sealing seat each, a switching element movably mounted in said housing and comprising a sealing part in each control chamber, said sealing part cooperating with said sealing seats such that these are opened or closed and comprising an actuating member for said switching element, said actuating member being able to bring said switching element into three positions, said sealing seats of at least one of said control chambers being disposed opposite each other on the one and the other side of said control chamber and wherein said scaling part arranged in said one of said control chambers is configured with two opposing tongues disposed between said sealing scats and configured so as to be elastically resilient, whereby, in a resting position wherein said actuating member is not actuated, said opposing tongues are spaced away from each other such that they may simultaneously close said two sealing seats.

* * * * *